Patented Mar. 23, 1926.

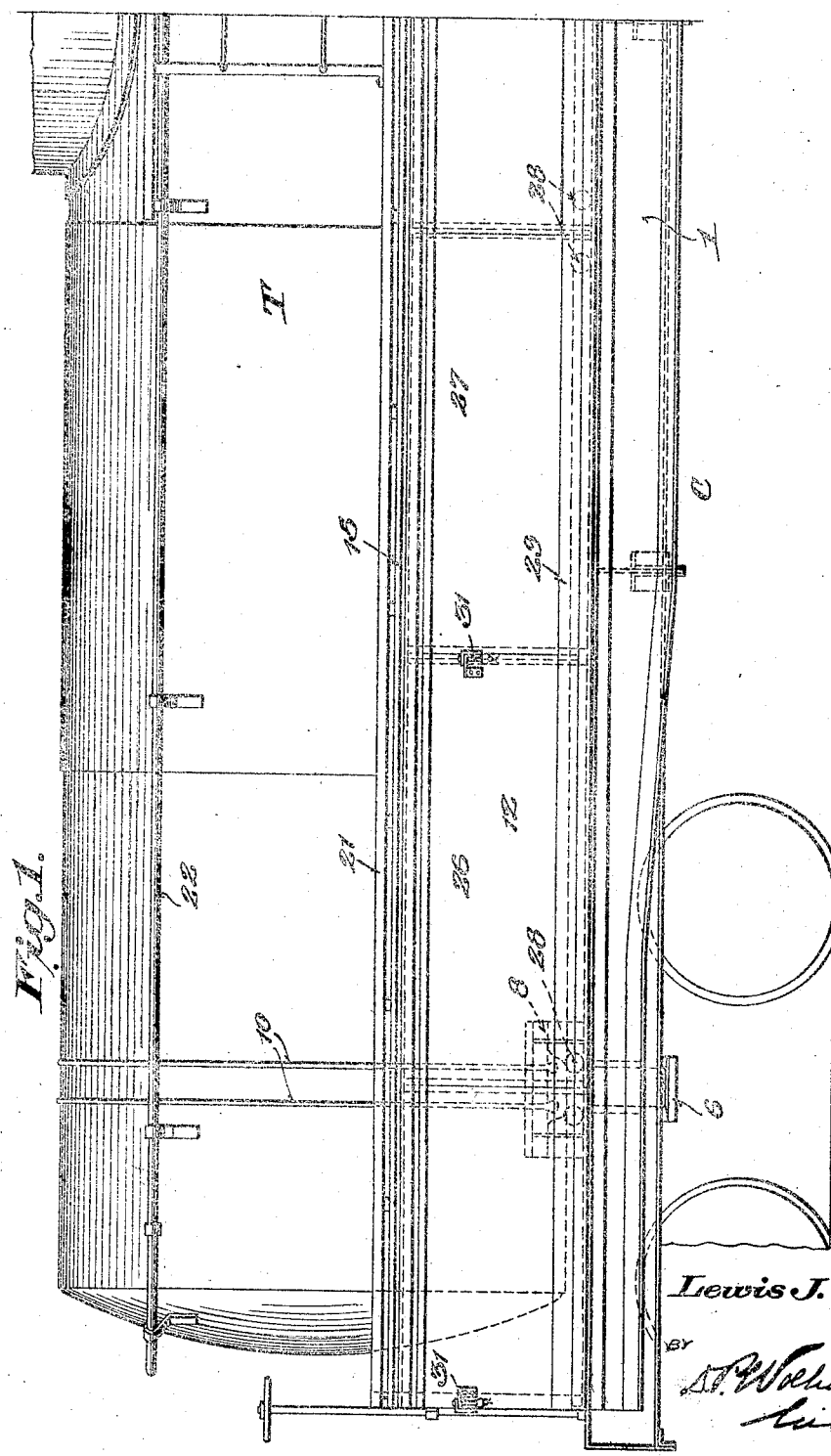

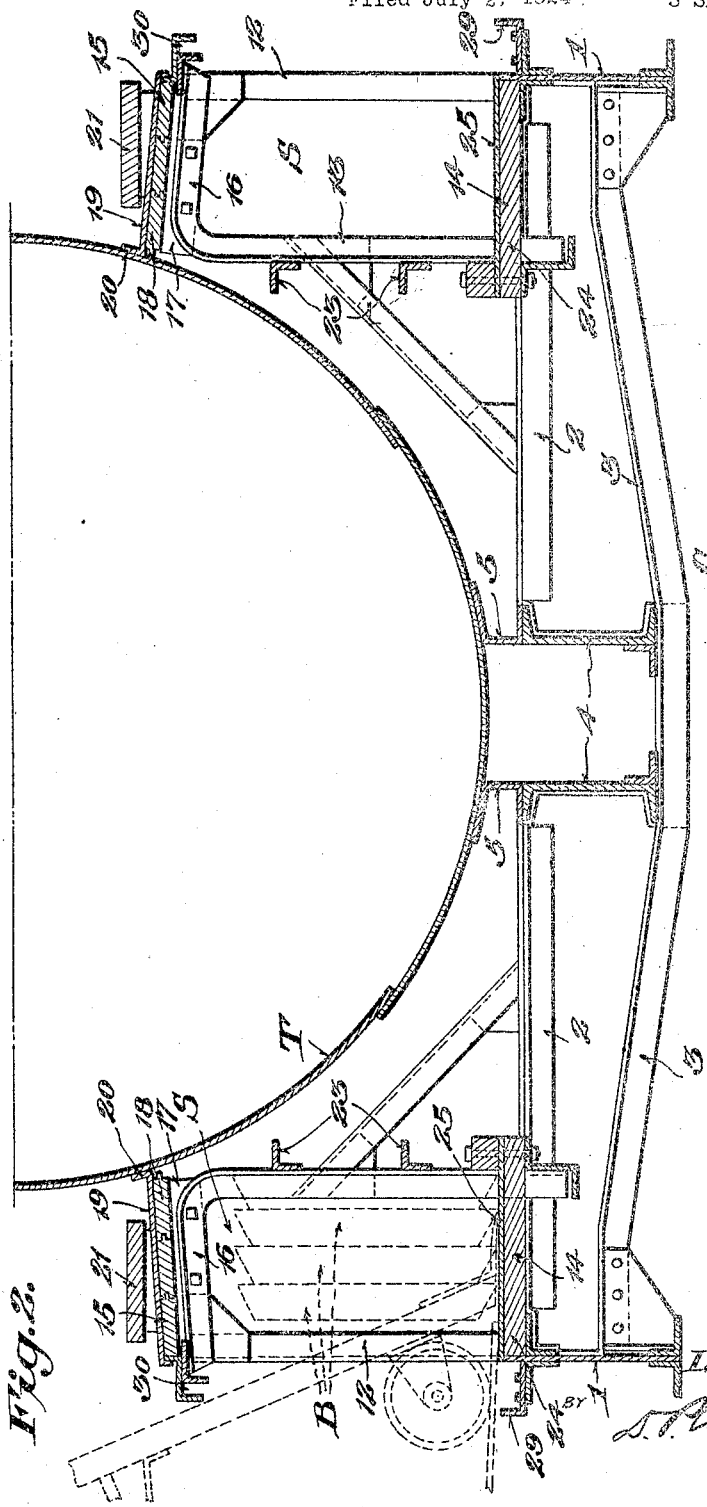

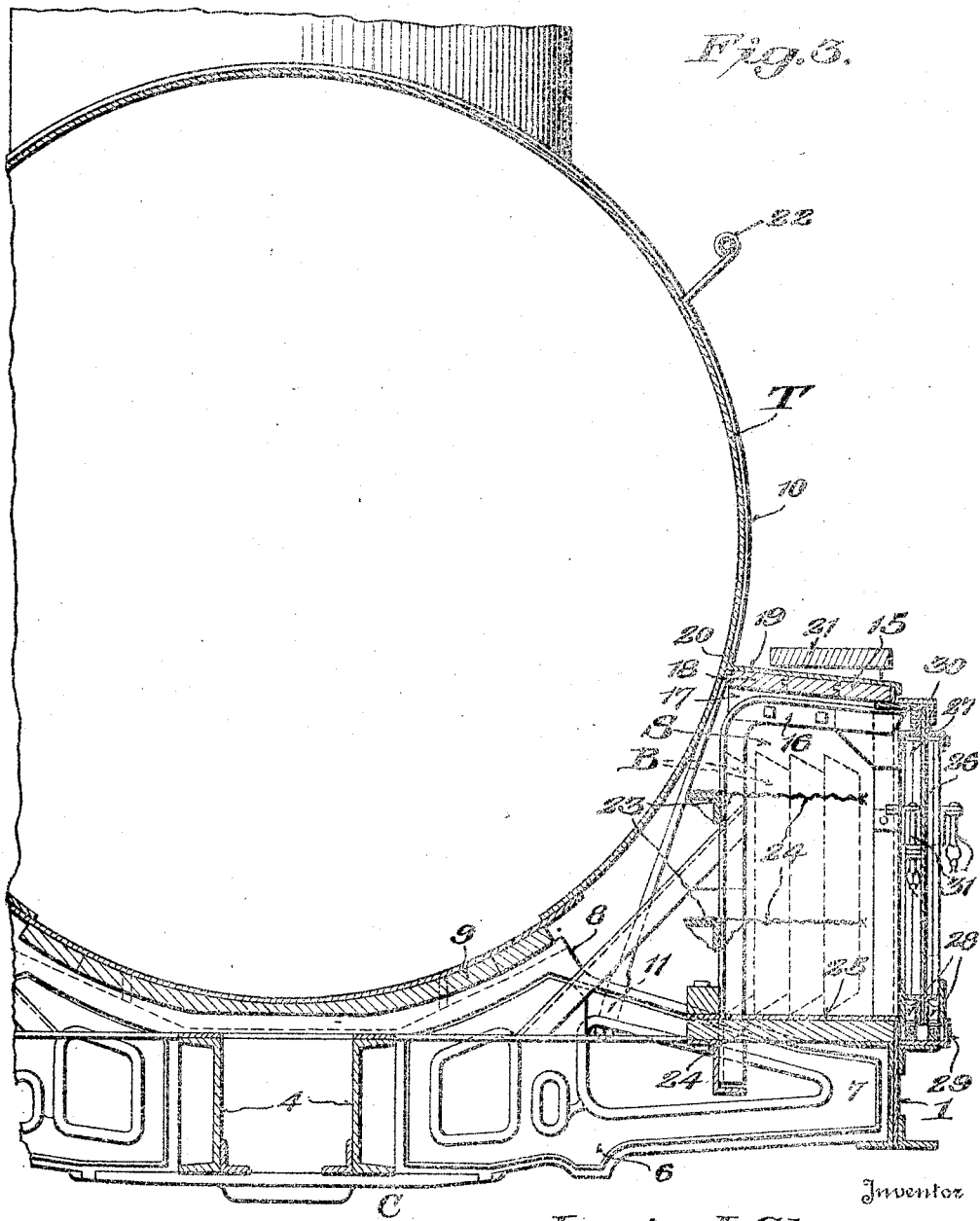

1,577,816

UNITED STATES PATENT OFFICE.

LEWIS J. SPENCE, OF BROOKLYN, NEW YORK.

FREIGHT-CAR CONSTRUCTION.

Application filed July 2, 1924. Serial No. 723,780.

*To all whom it may concern:*

Be it known that I, LEWIS J. SPENCE, a citizen of the United States, residing at New York, borough of Brooklyn, in the county of Kings and State of New York, have invented certain new and useful Improvements in Freight-Car Constructions, of which the following is a specification.

This invention relates to a novel freight car construction, particularly of the tank car type, and has for its primary object to provide cars of that type with supplementary cargo compartments which render the car available for carrying other commodities than oil.

As is well known, the type of freight cars known as tank cars usually are employed exclusively for transporting oil from the point where the oil originates to the point of delivery for consumption, and after such use the tank car is returned empty at a loss of revenue to the carrier. Furthermore, tank cars, as now generally used are neither designed nor adapted for, nor capable of being utilized for, carrying commodities other than oil, and the present invention has in view a novel re-designing of the structural parts of a tank car to combine in the one structure a means for securely supporting and fastening a tank upon the chassis structure of the car, and to provide supplementary cargo compartments which are arranged and constructed to carry substantial cargoes other than oil.

Also, it is the purpose of the present invention to so combine and consolidate the structural features of the cargo compartment with the tank seating and holding means as to strengthen and stabilize the entire car structure, while permitting it to perform its dual function as an oil carrier and as an independent carrier for other kinds of freight.

A more specific object of the present invention is to provide a freight car construction having a tank for carrying oil and supplementary cargo compartments which are designed and adapted for the accomodation of commodities which must be shipped under seal, as for example, copper bullion. A freight car capable of performing this dual function is of special utility in a service where petroleum can be carried from a seaport to a smelter plant and on the return trip can carry slabs of copper bullion from the smelter plant to the seaport.

With these and other objects in view which will be readily apparent to those familiar with the handling of freight on railroads the invention consists in the novel construction, combination and arrangement of parts hereinafter more fully described, illustrated and claimed.

Though susceptible of modification as to its details of construction, a preferred and practical embodiment of the invention is shown in the accompanying drawings, in which:

Figure 1 is a side elevation of a tank car construction embodying the improved features of the present invention.

Figure 2 is a vertical cross-sectional view of a car illustrating the adaptability for loading the supplementary cargo compartments from a platform, and Figure 3 is an enlarged cross-sectional view showing one of the supplementary cargo compartments loaded and the cargo lashed or tied in place to prevent shifting or displacement.

Like references designate corresponding parts in the several figures of the drawings.

The principal feature of the invention as above noted is a novel construction which combines the usual tank car features in an advantageous manner with the spaces at the sides of the tank to provide supplementary cargo compartments for carrying commodities other than oil.

Referring to the example of the invention shown in the drawings the car chassis may be designated generally, in its entirety, by the reference letter C and that chassis includes in addition to the wheels of the car, the side beams or sills 1, preferably of the structural flanged beam type, and upper and lower sets of flanged cross beams 2 and 3 connecting respectively with the upper and lower flanged portions of the sides beams 1 and arranged at suitably spaced intervals throughout the chassis to give the requisite strength and stiffness thereto. The said upper and lower cross beams 2 and 3 also are combined with central longitudinally arranged supporting girders 4 upon which are mounted seat plates 5 on which rest the bottom of the cargo or oil tank T.

In addition to the central longitudinal supporting girders 4 the chassis structure is provided preferably at each end thereof with a transverse bolster frame 6 fitting at its ends as at 7 in the inside channel portions of the side beams 1 and joined with the longitudinal supporting girders 4 to provide a well reinforced supporting structure for the oil or cargo tank T. In that connection the bolster frame 6 is provided at its upper side with an arched saddle portion 8 upon which rests a wooden or equivalent bearing shoe 9 in which the lower part of the tank is seated, as plainly shown in Figure 3 of the drawings; and, the tank is securely lashed or fastened to the bolster frame 6 by the usual tank band or bands 10 bolted or otherwise connecting with the bolster frame 6, at 11 as shown in Figs. 1 and 3 of the drawings.

The side portions of the chassis structure or body frame of the car project a sufficient distance beyond the sides of the tank to leave in the angle between each projecting side portion of the chassis and the adjacent side of the tank, a space which may be utilized to provide a supplemental cargo compartment of sufficient dimensions to carry a substantial cargo of commodities other than oil. In the form of the invention shown a supplementary cargo compartment designated generally by the letter S is constructed in a manner to permit commodities to be transmitted therein under seal, and to that end each of said supplementary compartments S is made in the form of a shed or enclosure within which the commodity is placed and sealed therein by means of doors and the usual car seals.

Each supplemental cargo compartment at the side of the car structure extends longitudinally of the chassis so as to have very substantial dimensions lengthwise of the car, and referring to the particular construction of this compartment, as shown in the drawings of the present case, it will be seen that the same essentially includes a front open door frame 12, a skeleton back frame 13, a floor 14 and a roof 15, thus completing a shed-like structure within which may be placed the commodities other than oil which it is desired to transport. The framing of the supplemental compartment S is preferably made of structural bars such as angle plates riveted or otherwise suitably fastened together in a rigid manner and to the chassis structure of the car in order to form a substantial and rigid side construction for the car. It is preferable in building the framing of the supplemental cargo compartment to utilize the form and arrangement of parts shown in the drawings, from which it will be seen that the back frame 13 of the supplemental compartment may consist of upright angle bars connecting with the chassis and having their upper end portions 16 bent outwardly to the front door frame 12 and having secured thereto the roof supporting member 17 upon which latter is fastened the roof 15 which may preferably include suitable roof boards 18 and a metal roofing plate 19, the latter conveniently joining the side wall of the tank as at 20 and closing the structure at that point so that the weather elements cannot reach behind the supplementary compartment. Also, a feature of practical importance in connection with the roofing part of the supplemental compartment is the provision thus made for supporting on top of the roof 15 a running board 21 for the crew and above the running board the tank has fitted thereto the usual hand rail 22.

The back frame 13 of the supplemental cargo compartment also may include a plurality of horizontally arranged angle framing bars 23 secured to the upright bars or angles 13 thus providing a very strong back frame for the supplemental cargo compartment while the said framing bars 23 may also be utilized as points of fastening for wires or other forms of ties 24 for fastening the cargo within the supplemental compartment, as shown in Fig. 3 of the drawings.

The floor part 14 of the supplemental cargo compartment may consist of a wooden or equivalent base 24 and a metal floor plate 25 both of which are suitably joined to the upper side of the flanged side beam or sill 1, thereby completing a shed or shed-like structure, simulating somewhat, a box type freight car. And, this shed or shed-like structure is adapted to be covered and uncovered by sliding doors 26 and 27 carrying supporting travelers 28 at their lower edges adapted to travel on track members in a lower door guide 29 fitted to the upper flanged part of the side beam or sill 1 of the chassis. The upper ends of these doors are suitably guided in a grooved upper door guide 30 mounted at the top edge portion of the door frame 12 and also arranged at the outer edge portion of the roof 15 in such a manner to act as an eaves for directing water off to the side of the car. The sliding doors 26 and 27 are adapted to be secured together, when closed, by any suitable door fastenings 31 which are intended to be protected by the usual car door seals, thus enabling a cargo to be shipped in the side supplemental compartments S under seal in the usual way.

While various commodities other than oil may be shipped under seal in the supplemental cargo compartment S an example is shown in the drawings which exemplifies the utility of the invention. That example is the placing of bullion, such as copper bars or bullion B in the said compartments, lashing or tying the same in place as shown in Fig. 3 and closing the same in under seal by means of the sealed doors 26 and 27 as above referred to. A cargo of that kind could advantageously be carried as above explained in a case where the tank is used to carry oil to a smelter plant, and on the return trip carry slabs of copper bullion from the smelter plant.

From the foregoing it is though that the construction, uses and many advantages of the herein described double-cargo car will be apparent without further description and it will be understood that changes in the form, proportion and minor details of construction may be resorted to without departing from the spirit or without sacrificing any of the advantages of the invention.

I claim:—

1. A freight car construction including a chassis having tank supporting means, a tank carried by said means and extending longitudinally of the chassis, and supplemental roofed cargo compartments carried by the projecting side portions of the chassis and paralleling the tank outside of the latter.

2. A freight car construction including a chassis having tank supporting means, a tank carried by said means and extending longitudinally of the chassis, structural frame members assembled in rigid relation on the projecting side portions of the chassis in the form of a shed-like enclosure extending along side of the tank wall, a roofing for said enclosure and door-mountings for the outer sides of said enclosures.

3. A freight car construction including a chassis having supporting means for a tank, and provided on each projecting side portion with metallic structural frame members connecting with the chassis structure and with the tank and arranged to form a shed-like structure providing a supplemental cargo compartment extending longitudinally of the chassis along side of the tank.

4. A freight car construction including a chassis having supporting means for a tank and carrying on each projecting side portion structural members connecting with the chassis structure and with the tank, said members being arranged to form a shed-like structure having a weather-tight roofing connection with the tank.

5. A freight car construction including a chassis having supporting means for a tank and carrying on each projecting side portion a shed-like structure having a weather joint roofing connection with the tank.

6. A freight car construction including a chassis having supporting means for the tank, and provided on each projecting side portion with a skeleton shed-like structure having a roof jointed to the sides of the tank and a doorway.

7. A freight car construction including a chassis having supporting means for a tank and provided on each projecting side portion with an upright shed-like structure formed of structural elements joined to the chassis and to each other, said shed-like structure being provided with a roof, a floor and a lateral door-enclosed doorway and extending longitudinally of the tank at the outer side thereof.

8. A freight car construction including a chassis having supporting means for the tank, and provided on each of its projecting side portions with an upright shed-like structure consisting of a skeleton framing of structural metallic members, a weather roof surmounting the framing and joined to the tank, a floor fitted into the bottom of the framing and a doorway having upper and lower guides for covering doors.

9. A freight car construction including a chassis having supporting means for the tank and provided on each of its projecting side portions with an upright shed-like structure consisting of a skeleton framing, a weather roof surmounting the framing and joined to the side of the tank, a floor fitted into the bottom of the framing and a doorway having upper and lower guides for covering doors.

10. A freight car construction including a chassis for supporting a cargo tank and provided at both sides thereof with upright shed-like structures for supplemental cargoes, each shed-like structure consisting of a skeleton framing of structural members, a roof surmounting the framing, a floor fitted within the lower part of the framing and a front doorway, upper and lower guides arranged respectively at the top and bottom of the doorway and sliding doors for covering and uncovering the doorway, said doors having engagement with said guides.

11. A freight car construction including a chassis having means for supporting a tank longitudinally thereof and provided with side portions projecting over the supporting means for the tank, supplemental cargo compartments supported upon said projecting side portions of the chassis, each of said supplemental cargo compartments comprising an open structural frame-work rigidly assembled and braced both to the chassis and to the tank, closed roofing for the structural frame-work, a flooring therefor and door mountings therefor.

In testimony whereof I hereunto affix my signature.

LEWIS J. SPENCE.